United States Patent [19]

Baker et al.

[11] Patent Number: 4,568,233
[45] Date of Patent: Feb. 4, 1986

[54] STORAGE AND RETRIEVAL APPARATUS

[75] Inventors: Dale A. Baker; Keith O. Jurkowski, both of Waukesha, Wis.

[73] Assignee: Harnischfeger Corporation, Milwaukee, Wis.

[21] Appl. No.: 638,202

[22] Filed: Aug. 6, 1984

[51] Int. Cl.$^4$ ............................................. B65G 1/06
[52] U.S. Cl. .................................... 414/267; 414/561; 414/608
[58] Field of Search .............. 414/227, 261, 266, 267, 414/331, 679, 560–562, 592, 608, 609, 611; 104/122, 162; 312/199

[56] References Cited

U.S. PATENT DOCUMENTS

3,756,433 9/1973 Richins ................................ 414/266
4,193,732 3/1980 Vetter et al. ..................... 414/592 X

*Primary Examiner*—Robert G. Sheridan
*Attorney, Agent, or Firm*—James E. Nilles

[57] ABSTRACT

The storage and retrieval apparatus of this invention comprises parallel tracks, each normally supporting numerous upright storage bins that are in close proximity to one another and to bins on laterally adjacent tracks. Each bin is open at its front and is mounted on wheels to roll rearward along its track. An overhead carrier lifts a desired bin off its track to a level above the other bins and carries it forward. A pusher near the front end of that track pushes rearward on the front bin, moving bins back to fill the space left by the lifted bin, which is then lowered into the space at the front of the track for loading or unloading, through its open front. On the top of each bin is an identifier plate distinctive to the bin. A sensor on the overhead carrier, connected with a computer, reads the identifier plates as the carriage moves rearward along a track and is thus able to find and lift a desired bin even though it is in a random position along the track. Gates at the front of the tracks are arranged to prevent personnel from getting in the way of bins being lowered.

9 Claims, 7 Drawing Figures

STORAGE AND RETRIEVAL APPARATUS

FIELD OF THE INVENTION

This invention relates to storage and retrieval apparatus of the type comprising storage bins in which articles are stored and movable hoisting means for carrying articles between a storage location and a loading and unloading station; and the invention is more particularly concerned with novel, space saving storage and retrieval apparatus that comprises a plurality of storage bins arranged in a compact cluster, with no aisles between bins, and a hoisting carrier that carries any selected one of the bins to a loading and unloading station.

BACKGROUND OF THE INVENTION

Several types of storage and retrieval systems are now in use, all of which are designed to provide as much storage capacity as possible on a minimum of floor area, in order to conserve valuable warehouse space. A satisfactory system must also provide means for quickly determining the location of any stored article, for removing it from storage, and for directing incoming stock to the location designated for its storage.

An older type of storage system comprises stationary racks arranged along relatively wide aisles to be accessible to a lift truck which can be driven along the aisles to any desired rack and which has an elevatable fork for retrieving articles from the racks. A generally similar system, but requiring less aisle space, comprises a stacker crane or similar carrier which serves the same purpose as the lift truck but which moves along the aisles on a track and which can swivel to either side of the aisle to be operable in aisles too narrow for a lift truck. One stacker crane may serve an entire warehouse, or there may be a dedicated stacker crane for each aisle. As with a lift truck, a stacker crane may be controlled by an operator who rides on the crane itself, although there is increasing installation of automated apparatus wherein the stacker crane is controlled by a computer.

Some further reduction in floor area needed for a given storage capacity is achieved with a revolving carousel comprising upright bins connected laterally like the links of a chain and guided by floor rails for movement in a long, narrow closed loop whereby a bin containing a desired article can be brought to a loading and unloading station at one end of the loop, where an operator manually removes the article from the bin. The carousel apparatus eliminates the need for a moving vehicle to carry articles between the storage location and the operator's station, and it lends itself to automation and computerized control. It has some disadvantages, however. Whenever a new bin must be brought to the loading and unloading station, the whole chain of bins has to be moved, and the operator cannot be stocking a bin or removing articles from it when the bins are moving. Hence the operator is sometimes compelled to be idle, waiting for a bin to be brought to the loading and unloading station from some distance away. Another significant disadvantage is that the chain of bins cannot turn square corners, and therefore the rows of bins along the opposite long sides of each loop must be spaced apart. Thus, even though adjacent carousels can be placed close together, with no significant unused floor space between them, there is a significant amount of unusable floor area inside the loop of each carousel.

In a sense, a lift truck carries the operator to the load whereas an automated stacker crane and a carousel move the load to the operator. In general, it is more efficient for the operator to remain at a fixed station where he can accomplish paperwork, operate a computer terminal and the like; but some of the potential efficiency of a load-to-operator system is sacrificed if too much time is required for bringing a desired article to the operator's station.

An important consideration in any storage and retrieval system is security against pilferage. The open racks used in a lift truck system offer a minimum of such security. A carousel system is superior in this respect because it can be enclosed in a fence or the like that prevents access to all bins except the one at the operator's station.

Thus satisfactory storage and retrieval apparatus should provide for a maximum of storage capacity in a minimum of floor area, be capable of computer control to bring a desired article to the operator rather than requiring an operator to go to the location where the article is stored, bring the article to the operator as quickly as possible, and provide good security against pilferage. An obvious further requirement is that the apparatus be low in cost.

SUMMARY OF THE INVENTION

The general object of this invention is to provide storage and retrieval apparatus which satisfies all of the above stated requirements, comprising a plurality of individual rack-like storage bins, each of which can be selected and carried to an operator's station for stocking and for retrieval of articles from storage, and wherein the bins are arranged in a compact cluster of laterally adjacent rows of bins, with no substantial spacing between bins in a row or of rows from one another, so that the entire cluster of bins occupies a minimum of floor space and bins on the perimeter of the cluster effectively block access to all other bins to prevent pilferage from them.

Another general object of this invention is to provide storage and retrieval apparatus wherein individual upright storage bins are delivered to an operator's station, as in a carousel system, but wherein bins other than a desired one need not be moved through any substantial distance and wherein bins containing articles most frequently needed are automatically maintained at locations nearest the operator's station, to minimize the amount of time and bin movement required during a period of operations.

Thus it is a further object of this invention to provide storage and retrieval apparatus of the load-to-operator type which, as compared to a carousel system, provides a higher storage capacity for a given floor area, consumes less time and makes less movement in accomplishing a number of stocking and/or retrieval operations, and affords better security against pilferage, all without substantially greater first cost or operating costs for a given storage capacity.

It is also an object of this invention to provide storage and retrieval apparatus comprising a plurality of upright rack-like storage bins, each of which is mounted on wheels and is unconnected with the other bins, an overhead carrier, and simple pusher means, said carrier and pusher means being cooperable for moving the bins within a defined area between storage locations and a loading and unloading station, said apparatus being so arranged that, if desired, the wheels of the bins can be castered and individual bins can be towed out of and back to said defined area for loading or unloading at a remote location.

In general, these and other objects of the invention that will appear as the description proceeds are achieved in the storage and retrieval apparatus of this invention, which comprises a plurality of mobile storage bins that are of uniform height and uniform width (although not necessarily of uniform length), each having an open front through which its interior is accessible and being mounted on wheels for forward and rearward movement. The apparatus further comprises a horizontally elongated straight track, on which the bins are normally supported in proximity to one another with their open fronts facing a front end of the track, by which the bins are guided for rearward motion, and from which the bins are upwardly removable. An overhead bin carrier comprises a carriage guided for movement lengthwise along the track at an elevation substantially above the same, and hoisting means on the carriage selectively engageable with each bin whereby a selected bin can be lifted above the other bins, transported forward by movement of the carriage, and lowered onto a front end portion of the track. Adjacent to the front end of the track is a pusher engageable with a bin thereat for pushing that bin rearward along the track to make room for a bin to be lowered.

Preferably each of the bins has parallel lengthwise extending channels on its top that define overhanging ledges which project laterally towards one another, and the hoisting means has a rigid transversely extending lifting element which is movable lengthwise between said channels and under the ledges to engage them for lifting a selected bin.

Preferably there is a machine readable identification means on the top surface of each bin; and sensor means on the hoisting means, connectable with a computer that controls lengthwise movement of the carriage and operation of the hoisting means, is responsive to said identification means for cooperation with the computer in selecting a desired bin to be lifted.

BRIEF DESCRIPTION OF THE DRAWINGS

In the accompanying drawings, which illustrate what are now regarded as preferred embodiments of the invention.

DETAILED DESCRIPTION OF PREFERRED EMBODIMENTS OF THE INVENTION

Storage and retrieval apparatus of this invention comprises a plurality of upright cages or rack-like bins 5, each of which comprises a sturdy frame that supports horizontal shelves 6 which are preferably adjustable as to their vertical spacing. Each bin 5 is open at its front to permit access to its shelves 6, although it will be understood that its open front can be closed at times when it is not being loaded or unloaded, as by means of a door or gate (not shown). Each bin can also be open at its sides and rear but it preferably has opposite upright side walls 7 and an upright back wall 8, all of which can be of sheet metal, expanded metal, sturdy screening or the like, and which reduce chances for pilfering and ensure that articles stored on the shelves 6 will not project horizontally beyond the bounds of the bin.

The several bins 5 are uniform in width, as measured between their side walls 7. They are also uniform in height, the height of each bin being such that articles on its uppermost shelf 6 are readily accessible. However, the bins need not be uniform in length, as measured parallel to their side walls 7; although if they differ in length, their length dimensions are preferably whole-number multiples of some modular length unit.

Each bin 5 is mounted on a set of rollers or wheels 10 on which the bin can roll forwardly and rearwardly. The wheels 10 are flanged or circumferentially grooved to cooperate with a track 11 which comprises a pair of straight rails 13 and on which a number of bins are supported and guided for forward and rearward movement. The track 11 can be recessed into a floor or laid on top of it, but in any event it will so cooperate with the wheels or rollers 10 as to allow each bin to be raised off of it and lowered back onto it anywhere along its length.

Near its bottom each bin 5 has a pair of sidewardly elongated bumpers 12, one on its front and the other on its rear, which can comprise end portions of a truck frame by which the wheels 10 are connected with the bin. These bumpers 12 are all at the same height, so that bumpers on lenghthwise adjacent bins along a track 11 are abuttingly engageable to transmit forward and rearward thrust from one to the other of the bins. At this point attention is directed to the fact that bins 5 in the apparatus of this invention are not connected with one another except in more or less transient bumper-to-bumper engagements, and therefore any bin can be raised off of a track 11 without distrubing any other bin.

In the preferred form of the apparatus of this invention there are several tracks 11, all extending parallel to one another. On each track there are normally a substantial number of bins that are lengthwise adjacent to one another to form an unbroken row that extends along substantially the full length of the track. Furthermore, the tracks 11 are spaced apart by such distances that the bins on laterally adjacent tracks are in close side-by-side proximity to one another. Thus the bins 5 of the storage system as a whole can occupy a rectangular floor area in which they are densely clustered, with no substantial amount of space between them, which is to say that substantially the whole of this rectangular area can be devoted to actual storage, unlike prior storage and retrieval systems wherein a substantial fraction of the floor area needed for the system had to be reserved for access to stored articles.

A bin to be loaded or unloaded is brought to the front end of its track, as explained hereinafter, where its shelves 6 are accessible to an operator through its open front. Thus the front end portion of each track constitutes a loading and unloading station. The front ends of the several tracks are laterally aligned with one another, and directly in front of them is an area of level floor 14 that comprises an operator's station for a person who stocks and unloads the bins at the loading and unloading stations.

Figure 1:
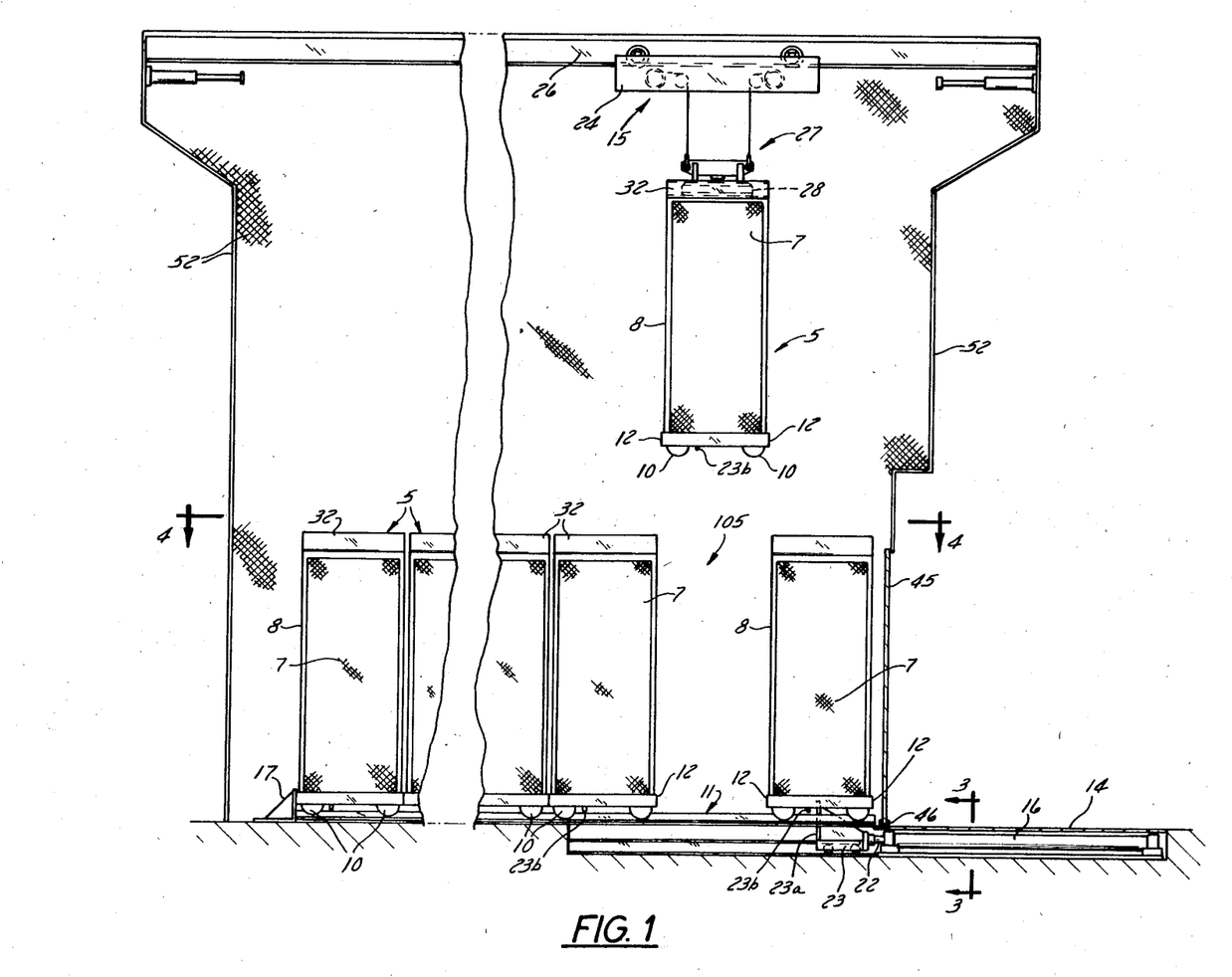
FIG. 1 is a view in side elevation of storage and retrieval apparatus embodying the principles of this invention.
Figure 2:
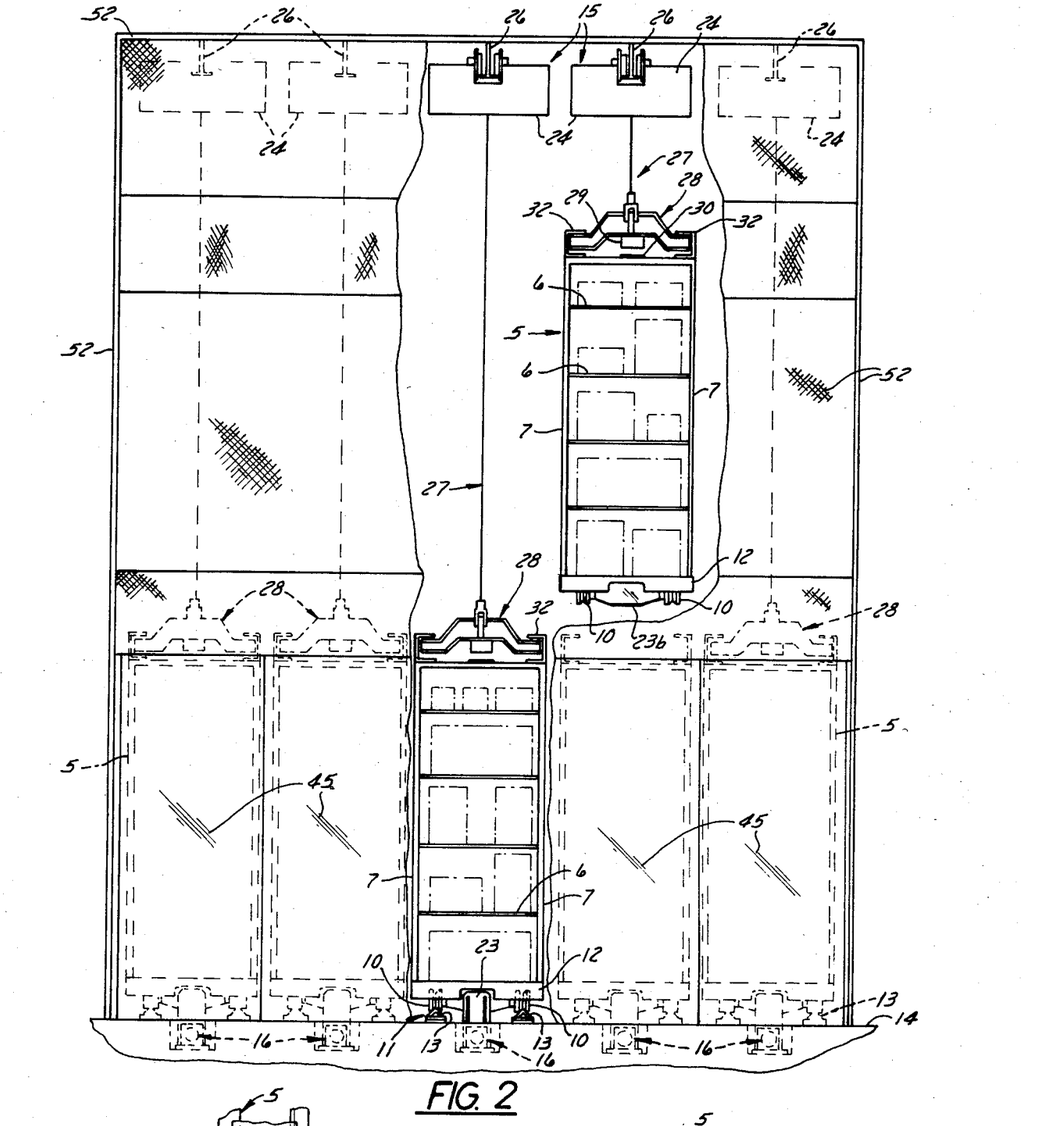
FIG. 2 is a view of the apparatus in front elevation.
Figure 3:
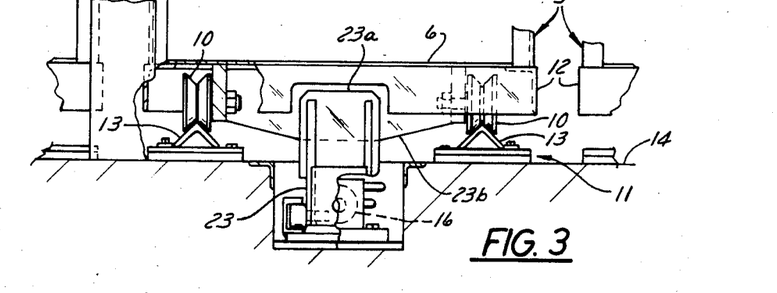
FIG. 3 is an enlarged fragmentary view in vertical section, taken on the plane of the line 3—3 in FIG. 1.
Figure 4:
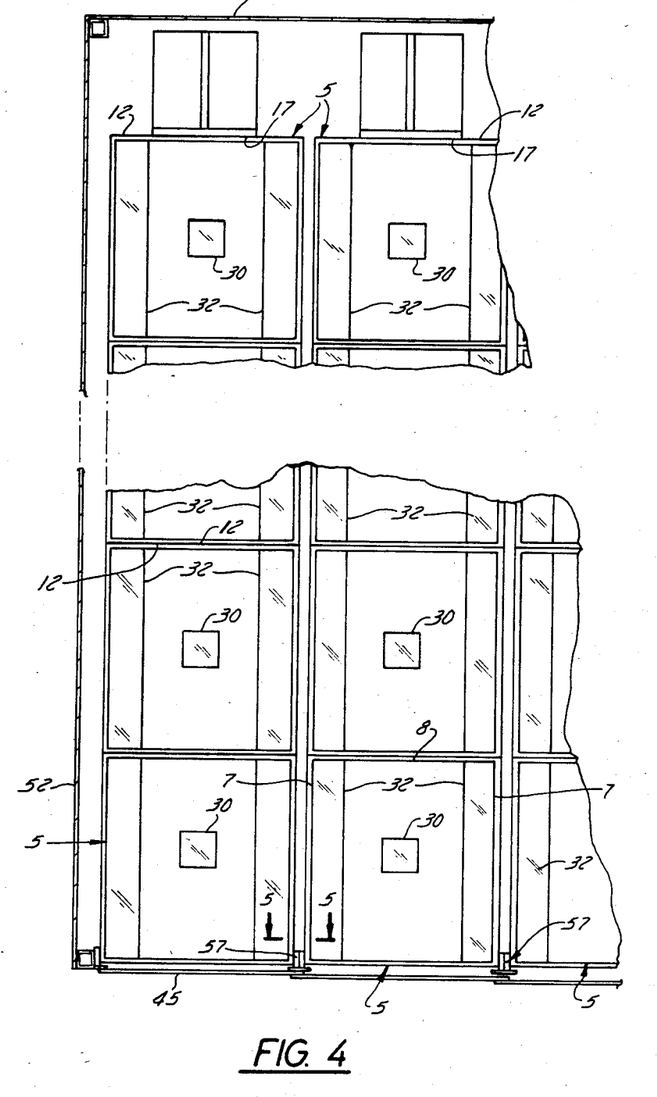
FIG. 4 is a fragmentary plan view of the apparatus.

For transporting a desired bin to the front end of its track, the apparatus of this invention comprises at least one overhead carrier 15. In operation this carrier moves lengthwise rearward along a track, above the storage bins, until it comes to a desired bin. It lifts that bin to a level above the tops of the other bins, thus opening a gap 105 (FIG. 1) between adjacent bins along the track, and it carries the removed bin forward over the other bins on the track to a position over the loading and unloading station at the front end of the track. When the operator is ready to stock or unload the removed bin, a pusher 16 at the front of the track engages the bin 5 which is then at the loading and unloading station and pushes it rearward, thereby imparting rearward movement to that front bin and to all bins behind it that are in bumper-to-bumper engagement with it and with one another. This train of bins is thus shifted back to fill the gap 105 left by the removed bin and clear a space at the front of the track in which the removed bin can be received. When safety conditions at the front of the track are fulfilled, the carrier 15 lowers the removed bin into the cleared space at the front of the track.

Preferably there is a stationary stop bumper 17 at the rear end of each track to ensure that the bins along that track will maintain lengthwise proximity to one another.

As here shown, each of the tracks 11 is laid on a floor that is level with the floor 14 of the operator's station. Each rail 13 of the track comprises an L-section angle iron laid in an inverted-V orientation, and the wheels or rollers 10 on which each bin is mounted have V-grooved peripheries so that they tend to center themselves on the rails 13 as they are lowered onto them.

The pusher 16 for each track, as here shown, comprises a hydraulic cylinder which is mounted under the floor 14 of the operator's station with its axis horizontal and parallel to the rails. The rear end of the rearwardly extendable ram or piston 22 of the pusher 16 is supported on a small cart 23 which moves forward and rearward in a trough between the rails of its track and which carries an upwardly projecting driver abutment 23a. Each bin has a downwardly projecting abutment 23b between its wheels against which the driver abutment 23a can engage for pushing the bin rearward, or the driver abutment can be arranged for engagement against the front bumpers 12 of the bins.

It will be obvious that other arrangements of the wheels 10, bumpers 12 and pushers 16 are possible. Conceivably, the front or rear wheels 10 of each bin could be castered so that bins could be towed off of the tracks and away from the cluster for stocking or unloading. It will be apparent that castered wheels would have to be provided with centering means that would cause them to realign themselves upon lifting of the bin. If the bins are to be towed away from the storage area, the normally stationary bumper 17 at the rear end of each track will be made adjustable along the track to ensure that all bins remaining on the track will be in proximity to one another.

Depending upon the number of bins 5 on each track 11 and the frequency of movement of bins in the cluster, there can be a dedicated overhead carrier 15 for each track 11 or, with suitable arrangements for its lateral shifting, one overhead carrier can service bins on two or more tracks. In either case, an overhead carrier 15 will comprise a carriage 24 that is guided on an overhead monorail 26 or the like for movement in both directions lengthwise along a track 11, hoisting means 27 on the carriage, and a lifting frame 28 which is raised and lowered by the hoist and which carries a scanner 29 on its underside that cooperates with a code plate 30 on the top wall 35 of each bin.

Figure 6:
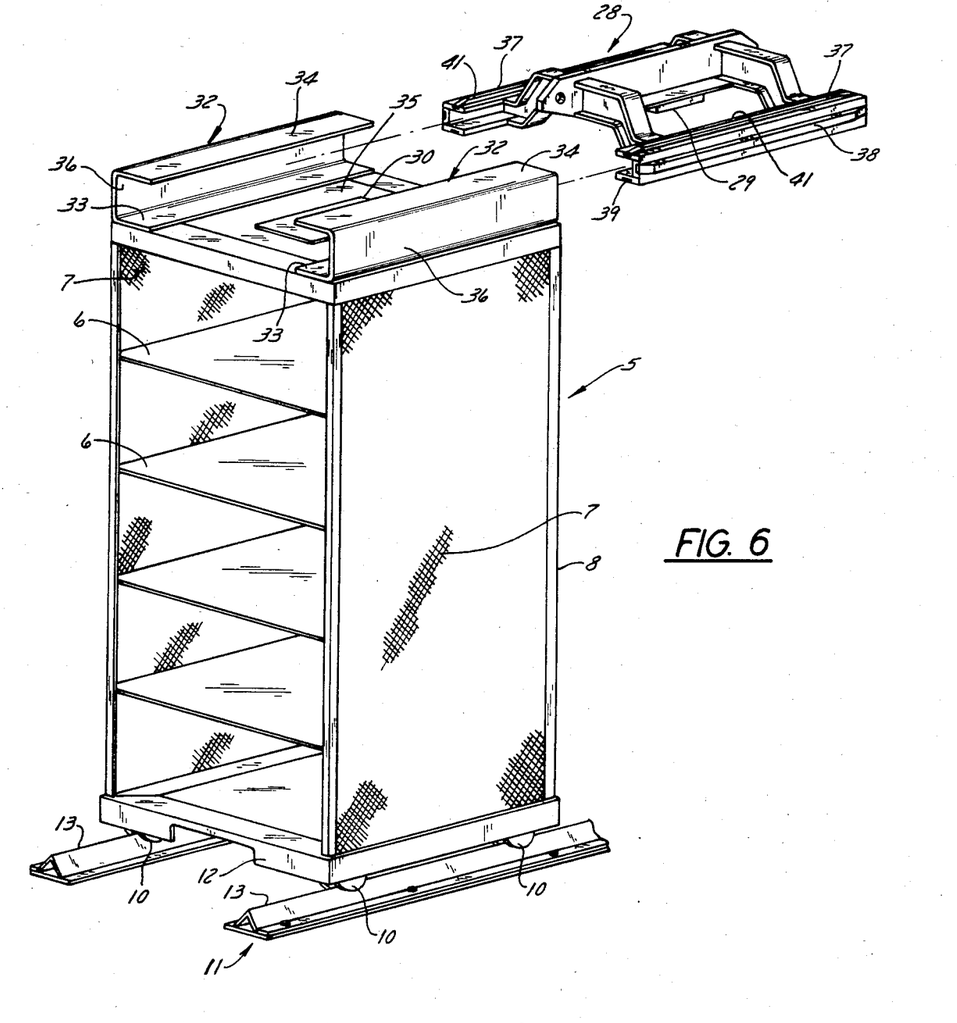
FIG. 6 is a perspective view of one of the bins in its relation to its track and the hoisting means.

For cooperation with the lifting frame 28 a pair of lengthwise extending U-shaped channels 32 (FIG. 6) are secured to the top of each bin, one along each side of it, each having one leg 33 flatwise overlying and firmly secured to the top wall 35 of the bin and its other leg 34 spaced above the top wall to provide a laterally inwardly projecting ledge. The lifting frame 28 comprises a rigid structure that is wide enough to extend between the upright web portions 36 of the two channels 32 on each bin, and has elongated side portions 37 that underlie the ledge-defining upper legs 34 of those channels and extend lengthwise along them. Preferably each side portion 37 of the lifting frame has a wear strip 38 along its side surface, for sliding engagement with the upright web 36 of its adjacent channel, and a wear strip 39 on its bottom for sliding engagement with the lower leg 33 of its adjacent channel. Obviously rollers (not shown) could be substituted for these wear strips 38 and 39. In addition, each side portion 37 of the lifting frame 28 has a readily replaceable wear strip 41 on its top surface, for flatwise engagement with the underside of its adjacent overhanging ledge.

Figure 5:
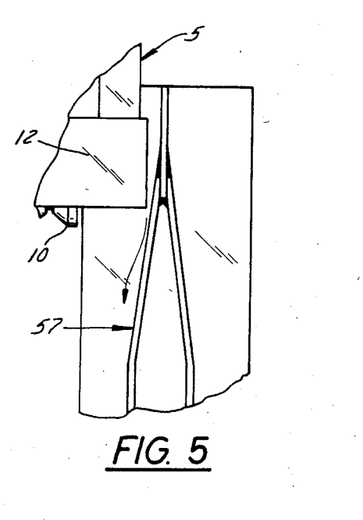
FIG. 5 is a fragmentary view in vertical section, taken on the plane of the line 5—5 in FIG. 4.
Figure 7:
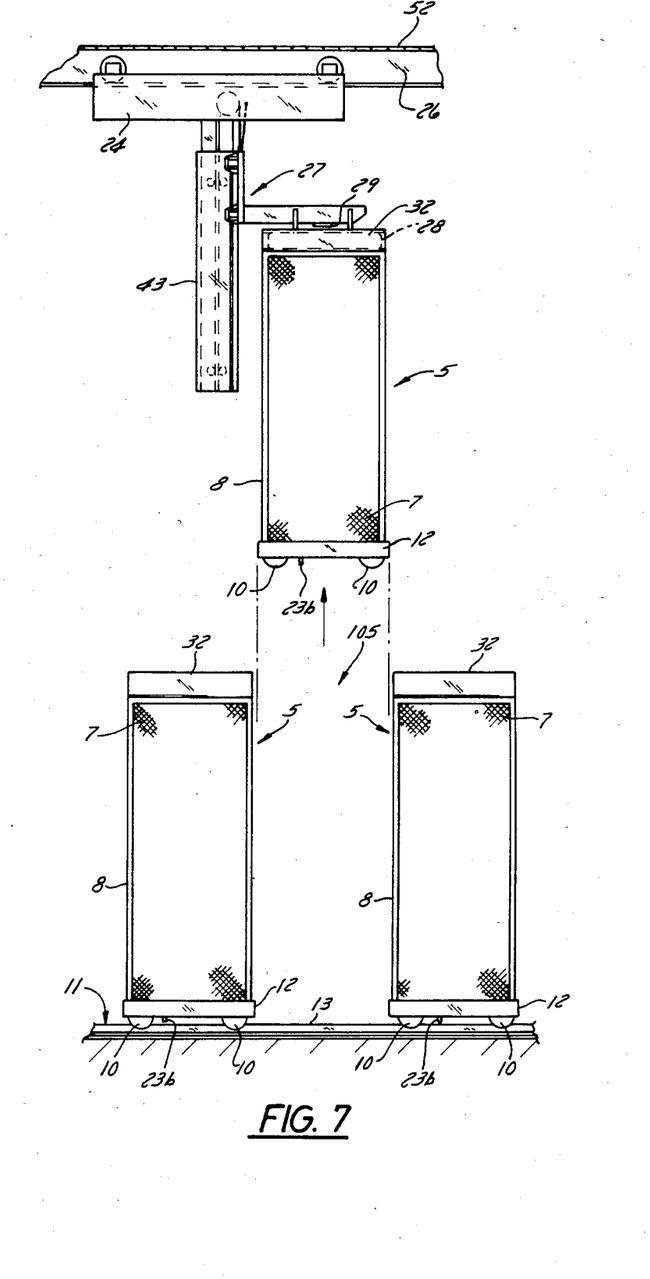
FIG. 7 is a fragmentary view in side elevation illustrating a modified embodiment of the invention.

Because of the close lateral juxtaposition of bins, upwardly tapering wedge-like guide elements 57 (FIG. 5) are secured at a level near the tops of the bins, between each pair of tracks and over the front end portions of the tracks, for laterally centering each bin as it is lowered and guiding it onto its track. Alternatively, the hoisting means 27 can be arranged to prevent swaying of bins as it lifts and lowers them. Those skilled in the art are familiar with various expedients for ensuring unswaying vertical motion of the lifting frame 28 relative to the carriage 24. As shown in FIG. 7, the lifting frame 28 can be carried on a telescoping mast 43 that projects downward from the carriage 24. The mast 43 is of the general type that is fully disclosed in U.S. Pat. No. 4,316,528 to M. J. Dechantsreiter and in earlier patents cited in that patent, and therefore details of it need not be presented here.

The channels 32 on each bin extend along its full length, from front to rear of it; and therefore as the carriage 24 moves along a row of bins on a track, its lifting frame 28 is substantially continuously under the ledges of successive bins along its path. In effect, therefore, the overhead carrier 15 is captive to the bins along a particular track unless it is moved to some distance beyond one end of that track.

The code plate 30 on the top surface of each bin bears an indicium distinctive to the particular bin. The code plates are at uniform locations on the top surfaces of the bins, between the channels 32 on them, to lie in the path of the scanner 29, which is mounted on the underside of a raised medial portion of the lifting frame 28. The scanner 29 cooperates in a known manner with a computer or a programmable controller (not shown) which controls the movements of the carriage 24 and the hoist 27 and in which is stored information that correlates the contents of the several bins with the coded identifications on the code plates 30 of the respective bins. Thus when the computer is fed with the designation of a particular item to be retrieved from storage, it determines the row of bins in which that article is stored and the code plate identifier for the bin containing that article, and it causes the carriage 24 to move along that row of bins, scanning the code plate on each bin as it goes, until the carriage comes to the bin being sought, whereupon the carriage is stopped. That bin is lifted and carried forward to the loading and unloading station as described above. After a removed bin is lowered into the loading and unloading station, the carriage preferably moves to a position over the second bin from the front end of the track until another bin is to be brought forward. Ordinarily, while one bin is loaded or unloaded, the next required bin will be found, brought forward, and held elevated above the loading and unloading station.

Because the contents of each bin are identified to the computer by the code plate 30 on the bin, and because the carriage 24 always starts its movement along a row of bins from near the front end of the track, the search procedure is not hampered by the fact that the bins are arranged in random order along the track. On the contrary, the computer memory does not have to contain information about storage locations. However, if the carriage 24 moves fast, the computer can be programmed to keep account of the existing sequence of bins, so that the carriage can begin decelerating at a bin ahead of a desired one, to be stopped exactly at the desired one.

Over a period of operation, bins that are most frequently called for will gravitate to positions near the front end of the track and will therefore be the ones that will be most quickly found and carried to the loading and unloading station. Thus the system automatically minimizes retrieval time for those articles that have the highest turnover rate, so that there is no need for planning storage locations in relation to rate of flow through storage.

As a safety measure that prevents personnel from getting in the way of a bin being lowered into the loading and unloading station at the front of each track, there is an edgewise slideable gate 45 for each track, at the front end of it. Each gate 45, when in a closed position, blocks access to the bin 5 at the front end of its track. The gates 45 for the several tracks are guided for edgewise sideward opening and closing motion on rails 46 or the like, arranged to dispose gates for adjacent rails in rearwardly stepped relationship such that each gate, when open, is close behind or in front of another gate.

The computer (not shown) with which the scanner 29 is connected and which controls the operations of the overhead carrier, prevents a bin from being lowered into the loading and unloading station at the front of a track unless the gate 45 for that track is closed.

It will be understood that the gates and the computer cooperate with suitable limit switches (not shown) or the like that detect the positions of the gates, and there may also be computer-controlled latching means for locking each gate in its closed position. Thus, for security against pilferage as well as safety of personnel, the computer can be so programmed that when one gate is open, all other gates are locked shut, and can also provide for all gates to be locked shut at predetermined times or under predetermined conditions. It will be evident that if the bins 5 have side and back walls 7 and 8, the gates 45 provide complete security against pilfering from them, since the front bin on each track blocks access to all others along the track. However, to prevent possible injuries to persons who might come too close to bins being pushed rearward along the outer tracks, walls 52 of screening or the like are preferably installed along the sides and across the rear of the cluster of bins. Obviously such walls 52 cooperate with the gates to provide further security against pilferage.

From the foregoing description taken with the accompanying drawings it will be apparent that this invention provides very efficient load-to-operator storage and retrieval apparatus which automatically positions nearest the operator those stored articles that are most frequently demanded and which provides for a maximum of security against pilferage with a minimum of fencing or screening means. As compared to prior storage and retrieval systems, the one of this invention requires somewhat more vertical space in order to provide a given amount of storage capacity, but overhead space is usually available so that the requirement for it creates no inconvenience or economic disadvantage. On the other hand the apparatus of this invention utilizes valuable floor area with greater efficiency than has heretofore been attainable inasmuch as substantially all of the floor area occupied by the apparatus is devoted to actual storage.

What is claimed as the invention is:

1. Storage and retrieval apparatus comprising:
   A. A plurality of mobile storage bins, all of uniform height, each said bin
      (1) having an open front through which its interior is accessible, and
      (2) being mounted on wheels for forward and rearward movement;
   B. a horizontally elongated straight track on which the bins are normally supported in proximity to one another with their open fronts facing a front end of the track, by which the bins are guided for rearward motion, and from which the bins are upwardly removable;
   C. an overhead bin carrier comprising
      (1) a carriage guided for movement lengthwise along said track at an elevation substantially above the same, and
      (2) hoisting means on the carriage, selectively engageable with each bin, whereby a selected bin can be lifted above the other bins, transported forward by movement of the carriage and lowered onto a front end portion of the track; and
   D. a pusher adjacent to said front end portion of the track, engageable with a bin thereat for pushing that bin rearward along the track to make room for a bin to be lowered.

2. The storage and retrieval apparatus of claim 1, further characterized by:
   (1) each bin having means on its top defining elongated parallel ledges that extend in the front-to-rear direction and project laterally towards one another; and
   (2) said hoisting means comprising a rigid lifting structure that is constrained to move forward and rearward with the carriage and is disposed to have laterally opposite portions under said ledges that engage the ledges of a selected bin for lifting the same.

3. The storage and retrieval apparatus of claim 1 wherein there are a plurality of tracks and a plurality of bins for each track, wherein all of the bins on each track are of uniform width as measured transversely to the tracks, and wherein said tracks are parallel to one another and are so spaced apart that bins on laterally adjacent tracks are width-wise adjacent to one another.

4. The storage and retrieval apparatus of claim 3 wherein there are a plurality of overhead bin carriers, one for each track, and a plurality of pushers, one for each track.

5. The storage and retrieval apparatus of claim 2 further characterized by:
   E. machine readable identification means on a top surface of each bin; and
   F. sensor means on said lifting structure, connectable with a computer that controls movement of the carriage and operation of the hoisting means and responsive to said identification means for cooperation with the computer in selecting a desired bin to be lifted.

6. Storage and retrieval apparatus comprising:
   A. a plurality of parallel tracks, each having a front end and a rear end;
   B. a plurality of mobile storage bins for each track, all of uniform height and normally closely adjacent to one another along the length of the track, each said bin
      (1) being mounted on wheels which cooperate with the track for guiding the bin in movement toward the rear end of the track but which permit upward removal of the bin from the track,
      (2) having an open front which faces the front end of its track and through which its interior is accessible, and
      (3) having a width to be in close proximity to bins on adjacent tracks;
   C. overhead bin carrier means, comprising
      (1) a carriage movable forwardly and rearwardly parallel to the tracks at a level above the tops of the bins and
      (2) hoisting means on said carriage whereby any selected bin along each track can be lifted above the other bins on its track, transported forward, and lowered onto a front end portion of its track; and
   D. a pusher for each track, adjacent to the front end of the track, for pushing a bin on said front end portion rearward to make room there for a bin that has been lifted off of the track.

7. The storage and retrieval apparatus of claim 6 wherein the front ends of the several tracks are substantially in lateral alignment with one another and wherein there is a floor area in front of the front ends of the tracks from which bins on said front end portions of the tracks can be unloaded, further characterized by:
   E. a gate for each track that is movable to a closed position between the front end portion of its track and said floor area, blocking access to a bin on said front end portion of its track, and an open position permitting access to that bin.

8. The storage and retrieval apparatus of claim 6 wherein said hoisting means comprises a rigid lifting structure that is constrained to move forward and rearward with the carriage and has laterally spaced portions that overlie the tops of the bins near opposite sides of them, further characterized by:
   E. means on the top of each bin defining overhanging ledges adjacent to opposite sides of the bin which project laterally towards one another and under which said portions of the lifting structure are engageable for lifting the bin.

9. The storage and retrieval means of claim 6 wherein said hoisting means comprises a rigid lifting structure that is constrained to move forward and rearward with the carriage and is normally in upwardly adjacent relation to the top of a bin, further characterized by:
   E. machine readable identification means on a top surface of each bin having indicia unique to the particular bin; and
   F. sensor means on said lifting structure, connectable with a computer that controls movement of the carriage and operation of the hoisting means and responsive to said identification means for cooperation with the computer in selecting a desired bin to be lifted.

* * * * *